(12) United States Patent
Gibbons

(10) Patent No.: US 7,777,897 B1
(45) Date of Patent: Aug. 17, 2010

(54) VENEER ROUGHNESS DETECTION

(75) Inventor: James Sheridan Gibbons, Eugene, OR (US)

(73) Assignee: Ventek, Inc., Eugene, OR (US)

(*) Notice: Subject to any disclaimer, the term of this patent is extended or adjusted under 35 U.S.C. 154(b) by 0 days.

(21) Appl. No.: 11/900,285

(22) Filed: Sep. 10, 2007

Related U.S. Application Data

(60) Provisional application No. 60/963,257, filed on Aug. 3, 2007, provisional application No. 60/966,105, filed on Aug. 23, 2007.

(51) Int. Cl.
*G01B 11/30* (2006.01)

(52) U.S. Cl. .................. 356/601; 356/237.1; 356/237.2

(58) Field of Classification Search ......... 356/600–613, 356/388, 390, 402, 403, 407, 408, 411, 420, 356/445, 448, 237.1, 1, 238.1, 238.2, 237.2
See application file for complete search history.

(56) References Cited

U.S. PATENT DOCUMENTS

| | | | | |
|---|---|---|---|---|
| 4,269,512 A | * | 5/1981 | Nosler | 356/623 |
| 5,526,446 A | * | 6/1996 | Adelson et al. | 382/275 |
| 5,703,960 A | * | 12/1997 | Soest | 382/141 |
| 6,122,065 A | * | 9/2000 | Gauthier | 356/394 |
| 6,313,913 B1 | * | 11/2001 | Nakagawa et al. | 356/237.2 |
| 2008/0239287 A1 | * | 10/2008 | Paavola | 356/73 |

OTHER PUBLICATIONS

Basler L301 kc User's Manual, Basler Vision Technologies, Document No. DA00051806 (Jul. 13, 2007).
James Gibbons, "Basler Color L301kc Cameras for Veneer Grading" (Feb. 2006).
James Gibbons, "Veneer Grading with Artificial Neural Networks," *Scan Pro 2000* (2000).
Kauppinen, "Development of Color Machine Vision Method for Wood Surface Inspection," OULU University Library (1999).
Sarah Sookman, "Lumber Support: Matrox Imaging Smoothes Out Knots in Wood Inspection," *Matrox Newsletter* (Oct. 2003).

* cited by examiner

*Primary Examiner*—Tarifur Chowdhury
*Assistant Examiner*—Michael LaPage
(74) *Attorney, Agent, or Firm*—Klarquist Sparkman, LLP

(57) ABSTRACT

A sample surface such as a surface of a wood veneer sheet is illuminated by a dual color light system and electronically scanned with a color line scan camera. The light system provides red and green light fluxes that are incident to a veneer surface from different directions, and corresponding line images associated with the red and green light fluxes are processed by rescaling, linear to log conversion, edge filtering, and/or thresholding to provide binary surface maps associated with veneer surface roughness.

25 Claims, 9 Drawing Sheets

| SHEET | LABEL | 90% LEVEL | 50% LEVEL | MEAN |
|---|---|---|---|---|
| Perfect | A | 31 | 10 | 13.31 |
| Very Good | B | 25 | 8 | 11.21 |
| Very Good | C | 32 | 10 | 14.34 |
| Acceptable | D | 32 | 10 | 14.6 |
| Acceptable | E | 33 | 12 | 15.3 |
| Almost | F | 46 | 14 | 20.29 |
| Almost | G | 28 | 8 | 13.35 |
| Too Much | H | 45 | 14 | 19.63 |
| Too Much | I | 52 | 14 | 22.46 |
| Way Too Much | J | 67 | 18 | 27.76 |
| Way Too Much | K | 49 | 16 | 22.72 |

FIG. 8

| SHEET | LABEL | 90% LEVEL | 50% LEVEL | MEAN |
|---|---|---|---|---|
| Perfect | A | 21 | 8 | 9.58 |
| Very Good | B | 31 | 10 | 13.73 |
| Very Good | C | 23 | 8 | 10.84 |
| Acceptable | D | 36 | 12 | 16.64 |
| Acceptable | E | 28 | 10 | 13.19 |
| Almost | F | 44 | 14 | 19.47 |
| Almost | G | 34 | 12 | 16.33 |
| Too Much | H | 54 | 18 | 23.59 |
| Too Much | I | 54 | 18 | 25.19 |
| Way Too Much | J | 62 | 20 | 27.93 |
| Way Too Much | K | 64 | 18 | 28.22 |

FIG. 10

VENEER ROUGHNESS DETECTION

CROSS-REFERENCE TO RELATED APPLICATIONS

This application claims the benefit of U.S. Provisional Patent Application No. 60/963,257, filed Aug. 3, 2007, and U.S. Provisional Patent Application No. 60/966,105 filed Aug. 23, 2007, both of which are incorporated herein by reference.

TECHNICAL FIELD

The technology disclosed herein relates to methods and apparatus for processing sheets of material, such as veneer or plywood, to facilitate estimation of surface roughness.

BACKGROUND

Plywood is manufactured by assembling multiple layers of veneer and glue in a sandwich that is compressed and glued together to form the sheet of plywood. Typically, face sheet laminations, for example, that vary in thickness, such as from 1/16 inch to 1/4 inch, are positioned as the outermost layers of the plywood. Knots and other voids in these face sheets are patched to upgrade the face sheets to improve the overall grade of the plywood. These face sheets are typically generally rectangular in shape, although it is not uncommon for veneer sheets to have non-orthogonal corners that are produced during manufacture of the sheets. Typically, face sheets are oversized to allow trimming of the assembled plywood sheet to a standard dimension with orthogonal corners. For example, face sheets used to produce 4-ft.×8-ft. standard sheets of plywood may be 51 in.×102 in., or otherwise oversized in dimension, to allow for such trimming. The face sheets need not be of a single piece of material, as face sheets or other veneer sheets can be formed by edge gluing elongated strips together to form the face sheets.

The surface roughness of plywood can be used for grading or other sorting or for manufacturing process control. While surface roughness estimation is important in assessing plywood, surface roughness estimation is also important in assessing materials in many different industries. Unfortunately, conventional methods of roughness assessment tend to be subjective, labor-intensive, expensive, inaccurate, or disruptive of manufacturing process flows. Surface roughness measurements of wood veneer based on light shadows produced by illuminating a surface under test with illumination at near grazing incidence tend to confuse surface ripples or differences in surface reflectivity caused by dark defects with roughness. 3-D cameras can be used but the height differences associated with veneer roughness are typically small in comparison to height differences readily detected by a 3-D camera. For these and other reasons, improved surface roughness estimation methods and apparatus are needed.

SUMMARY

Apparatus for surface roughness assessment include an illumination source configured to direct a first illumination flux and a second illumination flux to a test surface along a first axis of incidence and a second axis of incidence, respectively. An imaging system is situated to produce a first image of a selected portion of the test surface based on the first illumination flux and a second image of the selected portion of the test image based on the second illumination flux. A processor is configured to provide an indication of a surface roughness associated with the test surface based on the first image and the second image. In some examples, the first illumination flux and the second illumination flux are directed along a first axis of incidence and a second axis of incidence, respectively, that are substantially coplanar. In further examples, the first and second axes of incidence are substantially symmetric. In additional representative examples, the first illumination flux consists essentially of optical radiation at wavelengths corresponding to red and the second illumination flux consists essentially of optical radiation at wavelengths corresponding to green.

In additional examples, the imaging system comprises a color image sensor comprising a first detector set responsive to optical radiation at wavelengths associated with a red color and a second detector set array responsive to optical radiation at wavelengths associated with a green color. In representative examples, azimuthal angles of the first and second axes of incidences are between about 20 degrees and 70 degrees, or between about 40 degrees and 60 degrees. In some examples, the color image sensor is a color line scan camera.

Systems comprise at least one illumination source configured to direct at least a first illumination flux and a second illumination flux along a first axis of incidence and a second axis of incidence, respectively, to a surface under test. An imaging system is configured to produce at least a first image and a second image of a selected portion of the test surface based on the first illumination flux and the second illumination flux, respectively. A scanning system is configured to position the imaging system with respect to the test surface so as to produce the first image and the second image, and provide a first position indication associated with the first image and a second position indication associated with the second image. A processor receives the first image and the second image, and based on the first image, the second image, the first position indication, and the second position indication, produces a roughness estimate associated with the selected portion of the test surface. In representative examples, the processor is configured to produce a combined image of the selected portion of the test surface based on the first image, the second image, the first position indication, and the second position indication, wherein the combined image is indicative of surface roughness in the selected portion of the test surface. In further examples, the first illumination flux and the second illumination flux are correspond substantially to red and green illumination fluxes, respectively. In some representative embodiments, the imaging system includes at least a first detector array and a second detector array that are responsive to the red and green illumination fluxes, respectively. In other examples, the imaging system includes a color image sensor comprising a first detector array and a second detector array that are responsive to the red and green illumination fluxes, respectively. According to further examples, the first axis of incidence and the second axis of incidence are substantially symmetric, or the first axis of incidence and the second axis of incidence have azimuthal angles between about 30 degrees and 60 degrees.

Methods comprise illuminating at least a portion of a surface under test with a first illumination flux along a first axis of incidence and a second illumination flux along a second axis of incidence and obtaining a first image and a second image of at least the portion based on the first illumination flux and the second illumination flux. The first image and the second image are processed to produce a combined image and based on the combined image, an indication of surface roughness in at least the portion of the test surface is provided. In some examples, the combined image is based on a difference of the first image and the second image and the first axis of incidence and the second axis of incidence are substantially symmetric. In other examples, the first axis of incidence and the second axis of incidence have azimuthal angles of between about 25 degrees and 75 degrees.

These and other features and aspects of the disclosed technology are set forth below with reference to the accompanying drawings.

BRIEF DESCRIPTION OF THE DRAWINGS

FIG. 8 is a table of values associated with FIG. 7.

FIG. 10 is a table of values associated with FIG. 9.

DETAILED DESCRIPTION

Figure 1:
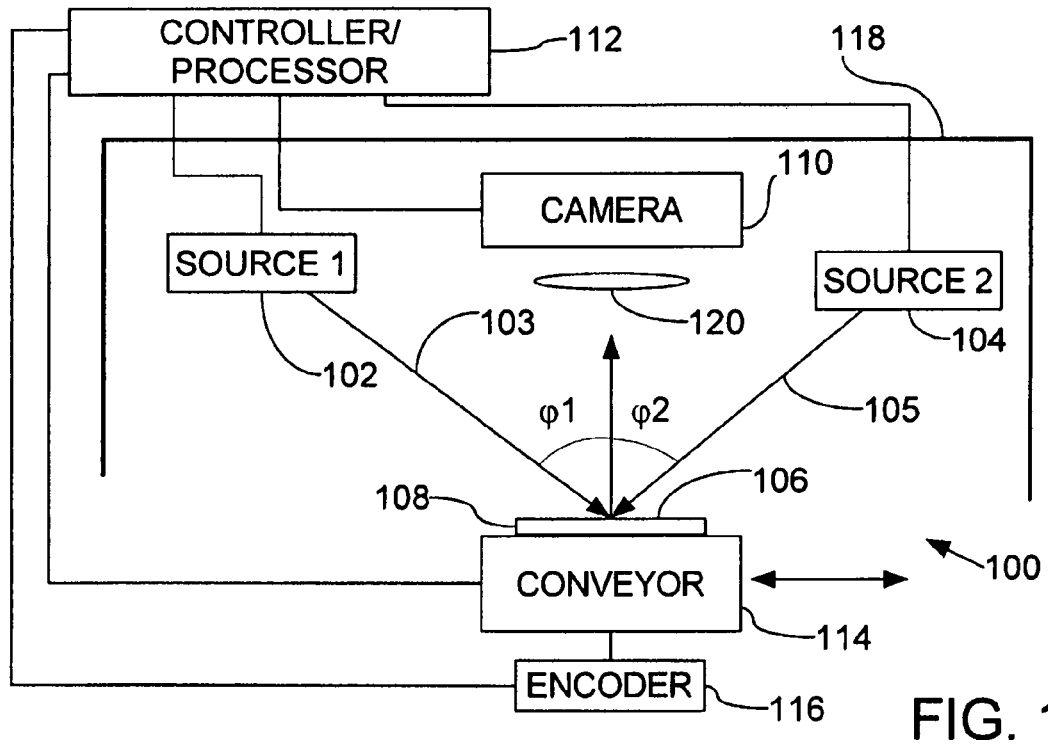
FIG. 1 is a schematic diagram of an apparatus that is configured to provide an estimate of surface roughness based on dual beam illumination.

As used in this application and in the claims, the singular forms "a," "an," and "the" include the plural forms unless the context clearly dictates otherwise. Additionally, the term "includes" means "comprises." Further, the term "coupled" can mean electrically, electromagnetically, mechanically, or optically coupled or linked and does not exclude the presence of intermediate elements between the coupled items.

The described systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some described embodiments, line or two dimensional images of portions of a surface under test are obtained and processed. While such images can be displayed on a display device for viewing, as used herein an image is generally a data array that includes intensity values for a plurality of test surface locations. Generally, position coordinates are understood based on data ordering in the arrays, and one dimensional or two dimensional arrays of intensity values are used. In some examples, an image includes a two dimensional array of color values.

Various imaging devices can be used to produce the images in the examples described below. As used herein, an imager is a device that produces an analog, digital, or other representation of an object, usually based on light intensities received at a plurality of sensor elements such as photodiodes or other photosensors. Such representations can be stored data or time varying electrical signals. Because many common and inexpensive imagers are responsive to visible light, examples described below are based on illumination fluxes that include visible light at wavelengths associated with one or more colors, and conveniently red, green, or blue wavelengths that correspond to the red/green/blue sensitivities of common color imagers. In other examples, illumination fluxes in different wavelength ranges can be used.

Illumination sources can include one or more light emitters, or emission from a single element can be spatially and/or temporally divided so at to produce one, two, or more illumination beams. Conventional optical elements can be used for beam shaping, if needed, but are not described herein.

Dual illumination roughness estimation methods as described below generally provide superior results to conventional methods. For convenience, exemplary methods and apparatus are described with reference to assessment of wood veneer roughness, but these examples can be readily adapted for other applications. In one convenient example, red and green light fluxes produced by corresponding LEDs or LED arrays are directed onto a surface under test from different directions, and images obtained with a line scan color camera are evaluated for high spatial frequency color differences. Relatively small angles of incidence (less than between about 30 degrees and 60 degrees) can be used. Because some woods used in plywood manufacture have a yellow hue, red/green light combinations tend to provide superior results to other combinations such as red/blue or green/blue. For surfaces of other colors, different color illumination fluxes can be selected based on the surface hue of the sample to be evaluated.

With reference to FIG. 1, a roughness assessment apparatus 100 includes a first light source 102 and a second light source 104 configured to provide respective illumination fluxes 103, 105 to a selected portion of a surface 106 of a sample 108. Typically, the illumination fluxes 103, 105 irradiate substantially only a region of interest on the sample 108. A camera 110 or other detector is situated to received portions of the light fluxes that are scattered or reflected by the surface 106 and an image of the surface portion is formed by a lens 120. The camera 110 produces first and second detector signals (or image signals or image data) associated with the scattered fluxes, and communicates the detector signals to a controller 112 that is also coupled to the light sources 102, 104. The controller 112 can be conveniently implemented as a desktop or laptop personal computer, a palm top or handheld computer, or as an application specific processing system. Typically the controller 112 includes random access memory, read only memory, a hard disk, and other computer readable/writable media that store instructions for roughness assessment based on the detector signals and for control of the detectors and the light sources. The sample 108 is typically situated on a conveyor belt 114 or other sample support that is configured to move the sample through the illumination fluxes and past the camera 110 so that roughness of multiple areas of the sample surface can be assessed. An encoder 116 is coupled to the controller 112 and the conveyor 114 so that movement of the sample 108 can be sensed and/or quantified.

The camera 110 can be based on a single detector or a plurality of detectors such as an array of detectors. Typically, a detector array is used so that scattered flux associated with an selected area of the surface 106 can be evaluated. The illumination fluxes 103, 105 can be configured so as to substantially simultaneously irradiate a selected portion of the surface 106. Alternatively, displaced areas can be irradiated, and based on a scan rate provided by the conveyor, detector signals, images, or image portions acquired at different times can be combined to assess roughness of a selected portion of the surface. For example, the encoder 116 can provide a first position indication for the first image and a second position indication for the second image so that the first and second image can be combined as described below. The position indications can be digital data values associated with surface coordinates or based on elapsed time and scan rate. A light shield 118 can be provided to block ambient or other unwanted light.

The illumination fluxes are generally arranged so as to be incident to the surface at angles between about 20 degrees and 75 degrees, 30 degrees and 60 degrees, or 40 degrees and 60 degrees. The illumination fluxes are also typically directed along co-planar axes that are at angle of between about 40 degrees and 150 degrees with respect to each other. Typically, a direction of incidence for one flux corresponds to a direction of reflection for the other. Superior performance for some surfaces is generally realized at angles of incidence of about 35 degrees and not greater than about 45 degrees. Selection of suitable angles of incidence can be based on substrate ripple or other substrate characteristic. As shown in FIG. 1, the fluxes 103, 105 are incident along co-planar axes and $\phi 1$ is substantially equal to $\phi 2$ but in other examples, different angles can be used.

In order to distinguish scattered fluxes associated with the first source 102 and the second source 104 at the detector, the first source and the second source can be configured to provide fluxes in different color or wavelength ranges. For example, a red LED and a green LED or linear or two dimensional arrays of such LEDs can be used as light sources, and red and green light fluxes directed to the surface 106. A color line scan camera can be used in which substantially independent detector signals are produced based on the red and green fluxes that are shaped so as to irradiate at least a portion of the surface. While red and green illumination is convenient, other colors or color combinations can be used, and radiation can be at ultraviolet, visible, infrared or other wavelengths and selection of colors and color combinations can be based on substrate reflectivity as a function of wavelength. As described below, image data can be processed so as to reduce the effects of surface color, but selection of illumination colors based on surface color can permit simpler implementation.

Independent image signals can also be produced with pulsed broadband or narrowband fluxes. In such examples, detector signals associated with fluxes incident to the surface from different directions are associated with corresponding pulse times. Independent detector signals can also be provided based on other light flux modulation in addition to timed pulses. If the surface is continuously scanned during irradiation, scattered fluxes from a selected surface area can be identified based on scanning rate and pulse timing. A configuration such as illustrated in FIG. 1 can be arranged so as to irradiate and acquire line or other images for samples of substantial sizes of up to at least about 3 m or more.

As shown in FIG. 1, the sample 108 (such as a veneer sheet) is pulled by the conveyor through a scanning area with roughness grooves aligned substantially parallel to the camera scanning line. Roughness grooves are typically aligned with wood grain because veneer peeling is aligned in this direction, and the grooves tend to be produced by a veneer knife pulling against the surface. For simple registration of red and green line scans, the conveyor speed is substantially constant, and the encoder 116 is provided so that previously or subsequently acquired line images can be associated with each other or with a currently acquired image. Typically, line scans of the two colors are taken with the sample at different positions due to the displacement of the corresponding sensor lines in the image sensor. Other types of cameras such as color prism cameras can be used as well.

Figure 2:
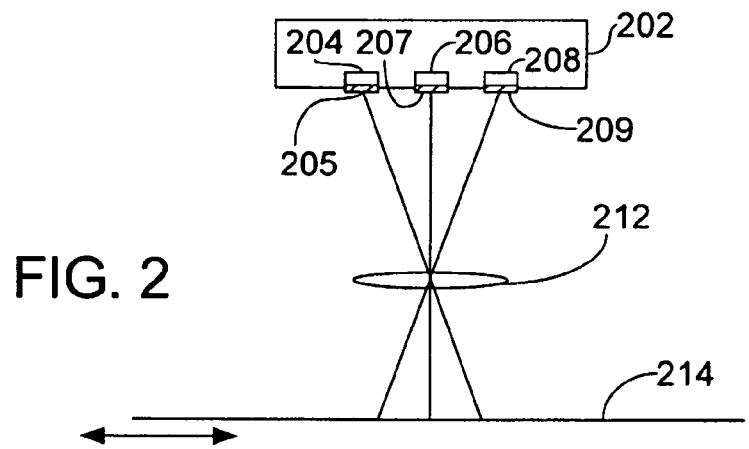
FIG. 2 is a schematic diagram illustrating imaging portions of a sample surface onto displaced linear detector arrays.

Referring to FIG. 2, a color line scan camera 202 includes one-dimensional detector arrays 204, 206, 208 that are provided with red, green, and blue filters 205, 207, 209, respectively. A lens 212 is situated to image a portion of a sample surface 214 on the detector arrays. As shown in FIG. 2, each array receives an image of a different portion of the sample surface 214, and images provided by the arrays are matched in response to movement of the sample surface 214 by a conveyor system such as indicated in FIG. 1. As noted above, an encoder can be provided to indicate a necessary displacement, and corresponding line images can be matched for processing.

Figure 3:
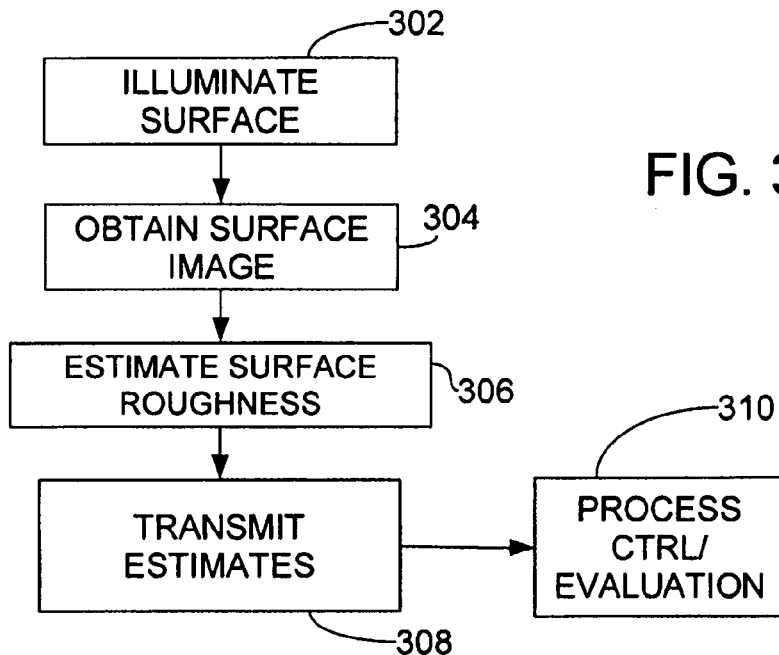
FIG. 3 is a block diagram of a method of estimating surface roughness.

Referring to FIG. 3, a method of surface assessment includes illuminating a measurement area with first and second light fluxes from substantially different directions in a procedure 302. As noted above, the first and second light fluxes can be red and green light fluxes, but color selection for other specimens can be based on spectral reflectivity of the samples to be evaluated. In a step 304, images of selected surface areas of the sample are obtained. Typically, the images are based on scattered portions of light fluxes incident from different directions. In a convenient example, red and green fluxes are directed to the surface, and scattered red and green fluxes are used to obtain corresponding red and green image data. In some examples, images are obtained with a line scan camera and measured or detected sample displacements are used to match line images of the same portion of the sample surface. Images are processed in a step 306, and roughness estimates are provided in a step 308. Based on the roughness estimates, a manufacturing process is adjusted, a manufactured part is graded, or some other control or evaluation procedure 308 is performed.

Figure 4:
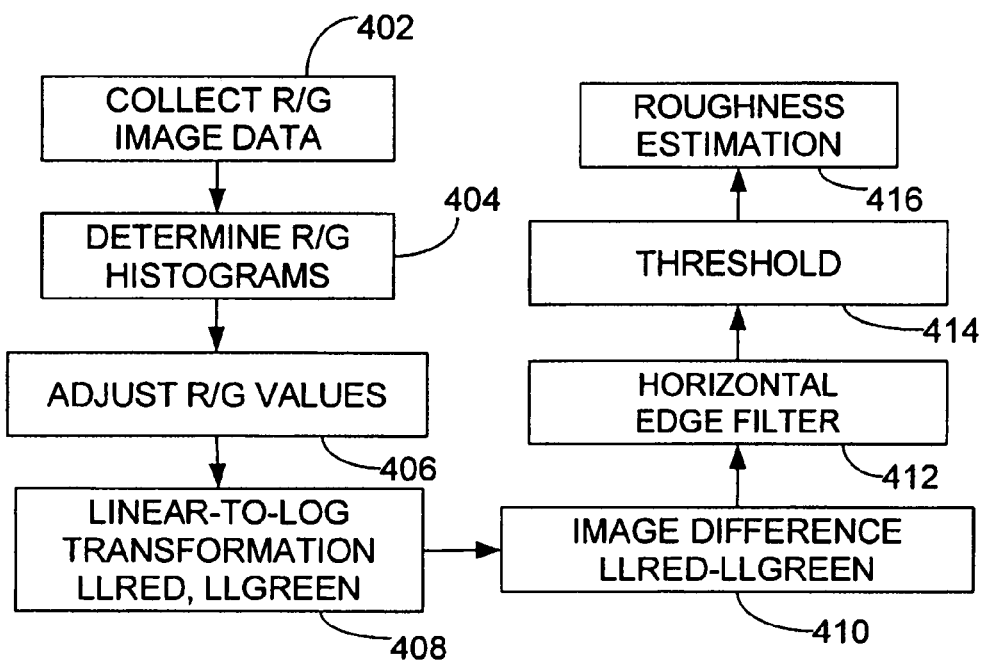
FIG. 4 is a block diagram of a method of processing image data to provide surface roughness estimates.

FIG. 4 illustrates a method of processing image data such as that produced by the method of FIG. 3. In a step 402, a full color (RGB) image is processed and image data associated with red and green illumination is stored as first and second data arrays in a memory. Typically, blue image data is discarded. In a step 404, intensity histograms for both red image data and green image data are produced, and intensity levels are identified with corresponding percentile rankings. In a step 406, red and green image data are independently adjusted so that a 99% percentile intensity level is set to 95% of full scale. For example, if image intensities are represented by eight bit numbers (full scale of 256), a 95% level is assigned a value 243, and red and green intensity values are scaled accordingly. In other examples, percentile levels of 80%, 90%, or other values such as a mean or median intensity can be used. In some examples, histograms can be obtained with graphics or photo editing software.

In a step 408, scaled red and green intensity values are converted to a modified logarithm scale. For intensity values in a range from 0 to 255 (8 bit values), an example modified logarithmic transformation can be based on a look-up table such as that generated by the following C code procedure:

```
int LUTable[256];
double x1=15;
double y1=log(x1);
double y2=log(255);
double s=(255-x1)/(y2-y1);
double b=x1-s*y1;
for (int i=0; i<256, i++)
{
   if (i<=x1)
   LUTable[i]=i;
   else
   LUTable[i]=s*log(i)+b;
}
```

Similar modified logarithm scalings can be provided for other data lengths such as 6, 12, 16, or 32 bits or other data lengths. Scaling values (x1,y1) and (x2,y2) can be varied. Based on such a look-up table, scaled red and green image data are assigned appropriate values to produce converted (log-adjusted) image data LLRED and LLGREEN.

In a procedure 410, difference image data is determined based on the converted image data LLRED and LLGREEN. Typically, the difference image is determined by pixel differences DIFPIXEL=(LLRED−LLGREEN+255)/2. While LLRED and LLGREEN are conveniently 8 bit signed integers between 0 and 255 representing image intensity, the intermediate difference should be calculated to 16 bit accuracy and then scaled back to an 8 bit signed result. In other examples, more or fewer bits can be used to represent image intensity or intensity differences. In a procedure 412, the difference image data is edge filtered with, for example, a horizontal Sobel filter or other edge filter to produce filtered difference data. In a thresholding procedure 414, the filtered difference data values are compared to one or more fixed threshold values to produce corresponding binary roughness maps that can be used to identify areas having a selected roughness. Blob analysis can be used to quantify areas associated with a selected roughness using differential or extrema-based methods. Results of a roughness determination can be presented on a display, processed images stored in a memory, or communicated to a process technician or otherwise communicated for process control or evaluation.

Roughness evaluations as described above can be communicated to, for example, a quality marking apparatus that prints or otherwise notes surface quality of the tested surface based on the evaluations. Piece-to-piece surface variations can be recorded to track process migration, or to provide quality data to customers.

Figure 5:
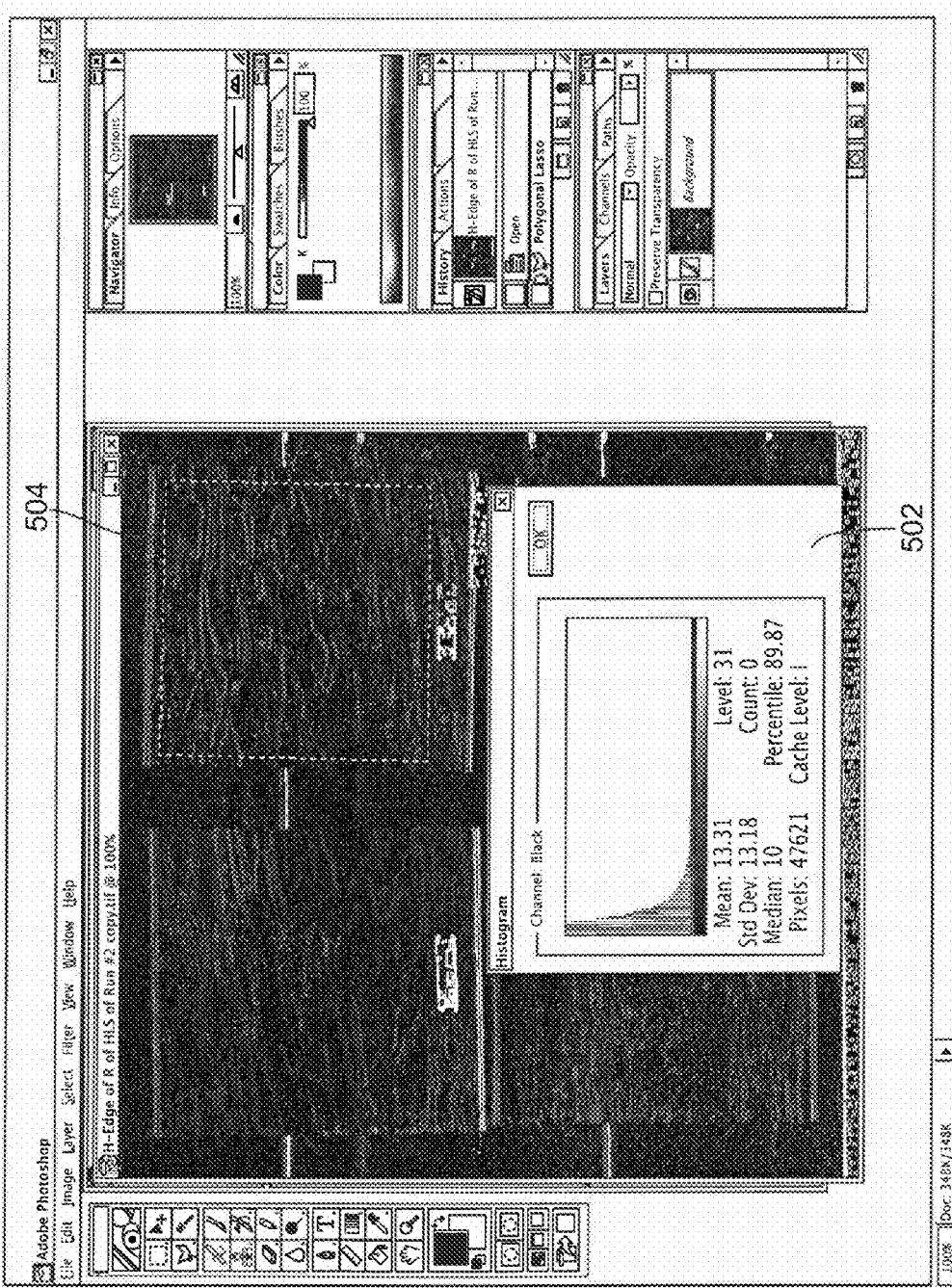
FIG. 5 is a screen shot illustrating image processing with a graphics editing program (ADOBE PHOTOSHOP graphics software).

FIG. 5 is a screen shot illustrating image processing with a graphics editing program (ADOBE PHOTOSHOP graphics software). As shown in FIG. 5, a histogram 502 is produced based on image data in a selected image area 504.

Figure 6A:
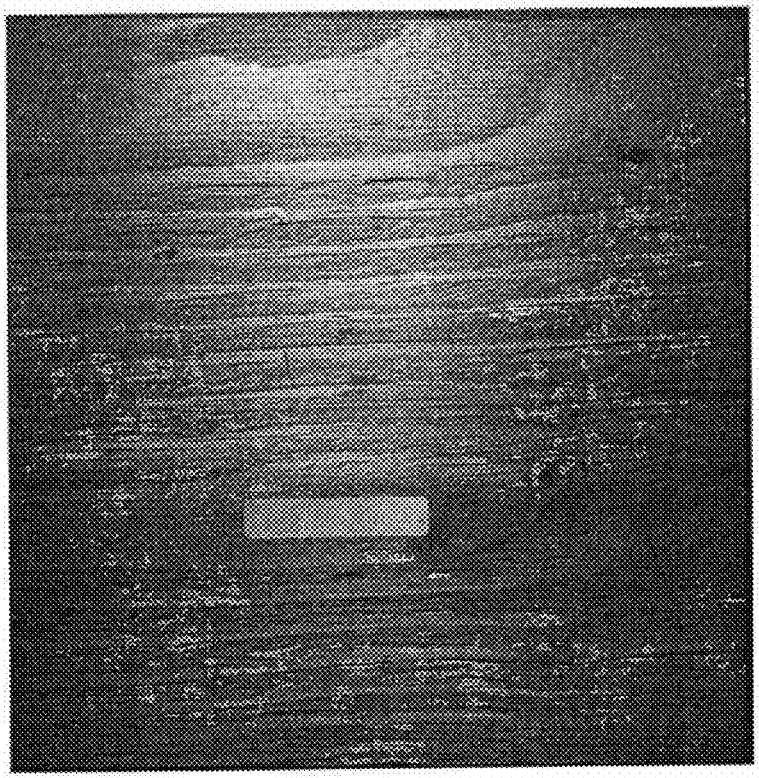
FIG. 6A is a normal image of a sample surface.
Figure 6B:
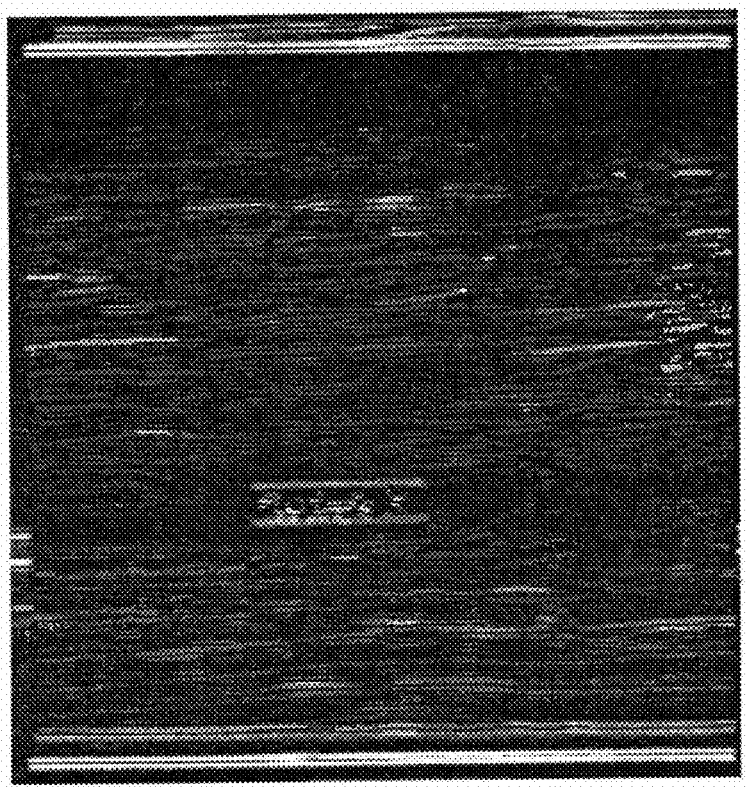
FIG. 6B is a processed image corresponding to FIG. 6A.

FIG. 6A is a normal image of a sample surface and a corresponding processed image is shown in FIG. 6B. Light areas in FIG. 6B correspond to rough areas of the sample. Light areas at the top and bottom of FIG. 6B are associated with sample edges.

Figure 7:
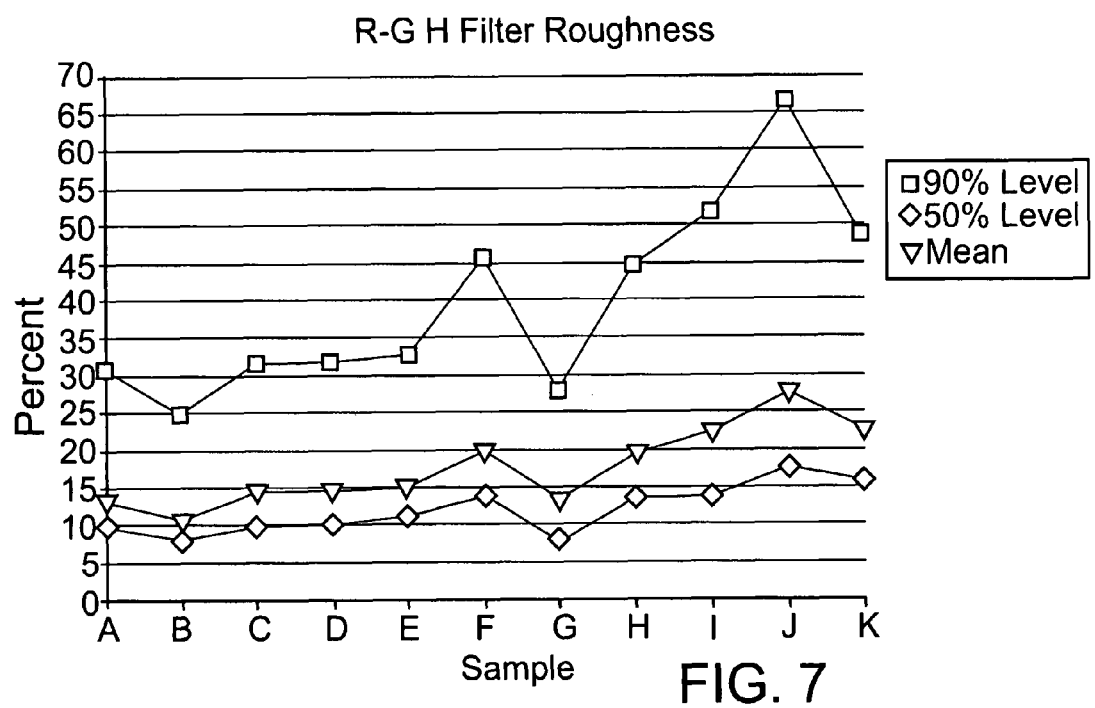
FIG. 7 is a graph of percentages of image pixels that were below a 90%, 50%, and a mean intensity for panels with smoothness ranging from smooth (A) to very rough (K) for red/blue illumination.

FIG. 7 is a graph of percentages of image pixels that are below a 90%, 50%, and a mean intensity for panels with smoothness ranging from smooth (A) to very rough (K) for red/blue illumination. Corresponding numerical values are in FIG. 8. Test surface roughness can be conveniently indicated with such roughness grades, or surface roughness map can be provided.

Figure 9:
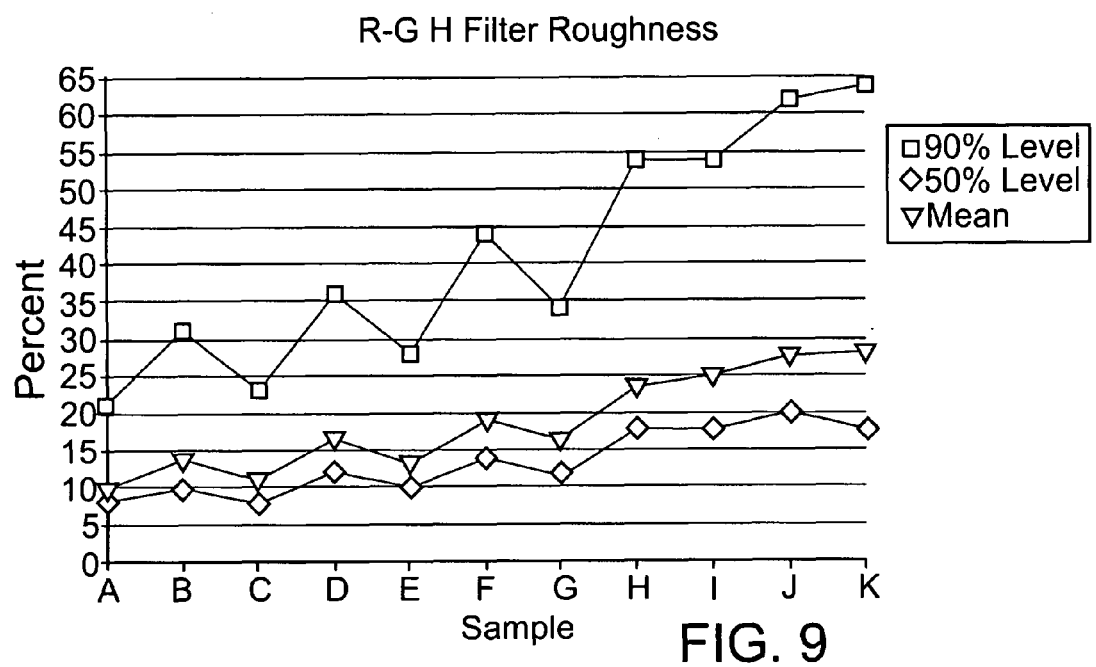
FIG. 9 is a graph of percentages of image pixels that are below a 90%, 50%, and a mean intensity for panels with smoothness ranging from smooth (A) to very rough (K) for red/green illumination.

FIG. 9 is a graph of percentages of image pixels that are below a 90%, 50%, and a mean intensity for panels with smoothness ranging from smooth (A) to very rough (K) for red/green illumination. Corresponding numerical values are in FIG. 10.

In some disclosed embodiments, a single light emitter such as an LED, incandescent lamp, or other light source is configured to provide illumination fluxes in both first and second wavelength ranges. These illumination ranges typically correspond to red, green, or blue color filter transmittances of color filters used in color cameras. In other examples, infrared or ultraviolet radiation can be used, and wavelength ranges established with interference filters or other optical filters within a suitable camera or situated external to the camera. In some embodiments, first and second illumination fluxes are provided by first and second illumination sources. As used herein, an illumination source can include one or more light emitting elements and can also include illumination beam forming devices such as lenses, mirrors, optical fibers, filters, prisms, or other optical elements that shape or spectrally filter an optical beam.

Illumination beams can be incident at a variety of angles and directions of incidence as described with reference to a spherical coordinate system shown in FIG. 11. In this coordinate system, R is distance from a point to the origin, φ is an azimuthal angle measured from a z-axis, and θ is a polar angle measured counterclockwise about a z-axis from the x-axis. A z-axis is generally perpendicular to a surface under test. To avoid ambiguity in specification of angles, azimuthal angles φ are in a range $0 \leq \phi \leq 180$ degrees, and polar angles θ are in a range $-180 < \theta \leq +180$.

Figure 11:
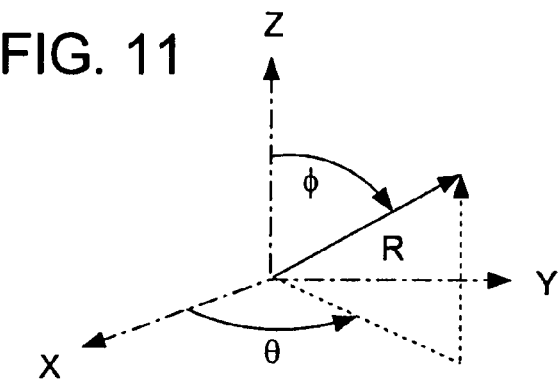
FIG. 11 is a diagram of a coordinate system used in defining axes of incidence.
Figure 12:
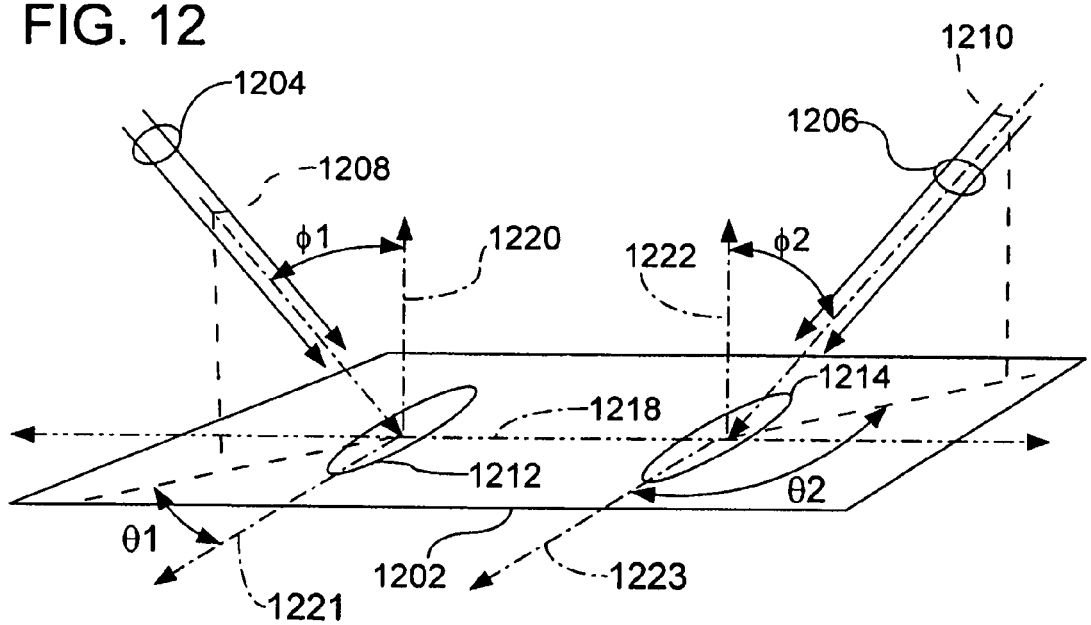
FIGS. 12-13 are perspective views of illumination configurations based on two displaced illuminated portions of a surface under test.

FIG. 12 illustrates a typical arrangement of illumination beams based on the coordinate system of FIG. 11. As shown in FIG. 12, a workpiece surface 1202 is illuminated by first and second illumination beams 1204, 1206 that are incident along axes 1208, 1210, respectively. The axes 1208, 1210 have azimuthal angles φ1, φ2 with respect to z-axes 1220, 1222, respectively, that are substantially perpendicular to an ideal workpiece surface (i.e., a workpiece surface absent irregularities) and have polar angles θ1, θ2 with respect to x-axes 1221, 1223 that are perpendicular to the respective z-axes and a common y-axis 1218. As shown in FIG. 12, illuminated areas 1212, 1214 are situated along the common y-directed axis 1218 that can be associated with a direction of travel of the workpiece surface 1202. In other examples, the illuminated areas are not along a common axis, and can be close together or relatively distant on the workpiece. In a typical implementation, the azimuthal angles φ1, φ2 are substantially equal, the polar angles θ1, θ2 are about −90 degrees and +90 degrees, respectively, so that the axes 1208, 1210 are coplanar.

The axes of incidence 1208, 1210 shown in FIG. 12 are convenient examples, and other combinations of axes of incidence can be used. In some examples, first and second illuminations fluxes are incident along incidence axes having substantially the same azimuthal angles ($\phi 1$, $\phi 2$ with respect to surface normal to either an actual or ideal workpiece surface, and that are at respective polar angles $\theta 1$, $\theta 2$ such that a magnitude of the difference of the polar angles ($\theta 1-\theta 2$) is about 180 degrees. Such axes of incidence are referred to herein as symmetric axes of incidence because they are substantially mirror images about the surface normal in a plane containing both. In symmetric arrangements, the azimuthal angles are generally within about ±2, ±5, ±7, 5, or ±10 degrees of each other, and the polar angles are selected so that the magnitude of the difference of the polar angles is within 5 degrees, 10 degrees, or 15 degrees of 180 degrees. The axes 1208, 1210 are one example of such an arrangement. The axes of incidence can also be configured to be substantially perpendicular to a direction of travel of a workpiece. In such examples, two line sensors can be situated along a common axis to overcome the image offset associated with a single full color line image sensors in which red, green, and blue responsive detector arrays are displaced with respect to each other. In this perpendicular arrangement, workpiece scanning may not be sufficient to situate the workpiece so that surface images of a common workpiece area can be obtained for both axes of incidence.

Figure 13:
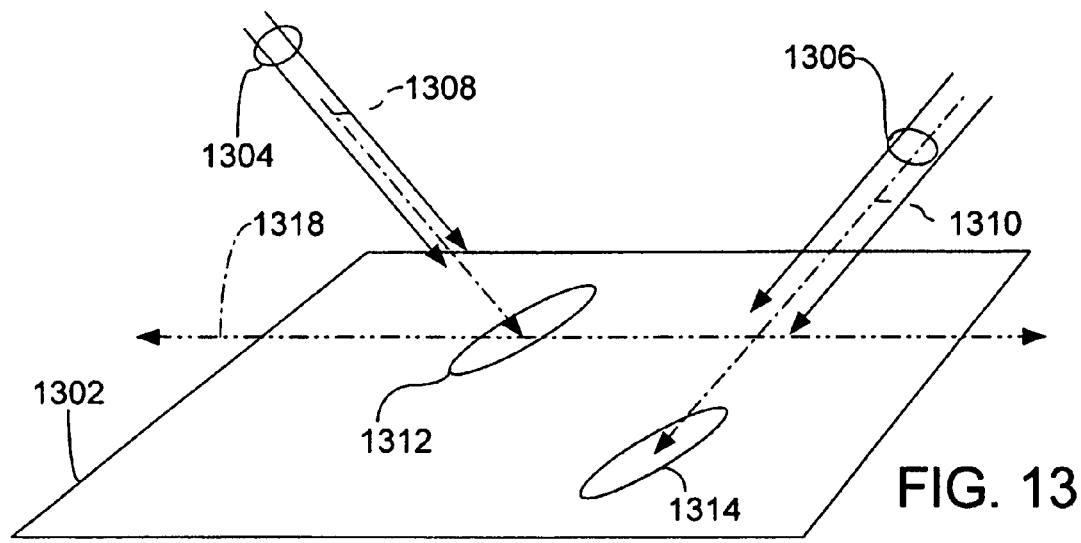

With reference to FIG. 13, illumination fluxes 1304, 1306 are incident along respective axes 1308, 1310 to portions 1312, 1314 of a target surface 1302 that are not along an axis 1318. Images associated with these illumination fluxes are combined based on positional coordinates associated with scanning of the surface 1302, and typically separate image sensors are used with each illumination flux. The illumination fluxes 1304, 1306 can be associated with red, green, blue, or other colors, or a broadband visible light flux can be used.

Figure 14:
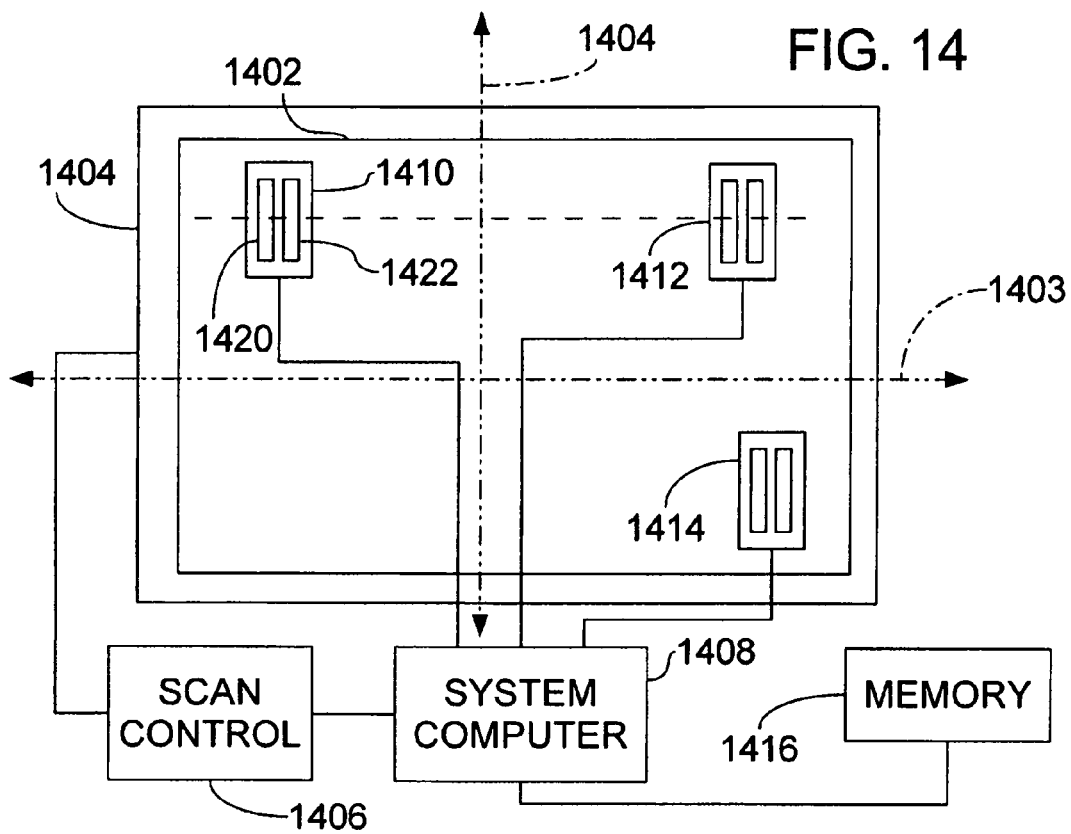
FIGS. 14-15 are schematic diagrams of systems for assessing roughness of a veneer sheet or other material.

FIG. 14 is a schematic diagram of a system that includes a scan table or other scanning support 1404 to which a test object 1402 such as a veneer sheet is coupled for analysis or processing. Imager/illuminator assemblies 1410, 1412, 1414 are situated to obtain images of selected portions of the test sheet and couple the images to a system computer 1408. As shown in FIG. 14, the imager/illuminator assembly includes an illuminator 1420 such as one or more LEDs and a linear detector array 1422. The assemblies 1412, 1414 are similar to the assembly 1410 but at least one is arranged so that an axis of incidence of the associated illumination flux is substantially symmetric to that of the assembly 1410. Scan coordinates are coupled to the system computer 1408 by a scan controller 1406, and image data and coordinate data are stored in a memory 1404 such as RAM, ROM, CD, or other computer readable media. The computer is configured to process the image data and produce one or more roughness indications using computer-executable instruction stored in the memory 1416. Based on the processed image data, the processor provides a roughness indication such as a letter grade or other scaled roughness indication, or a surface roughness map.

Figure 15:
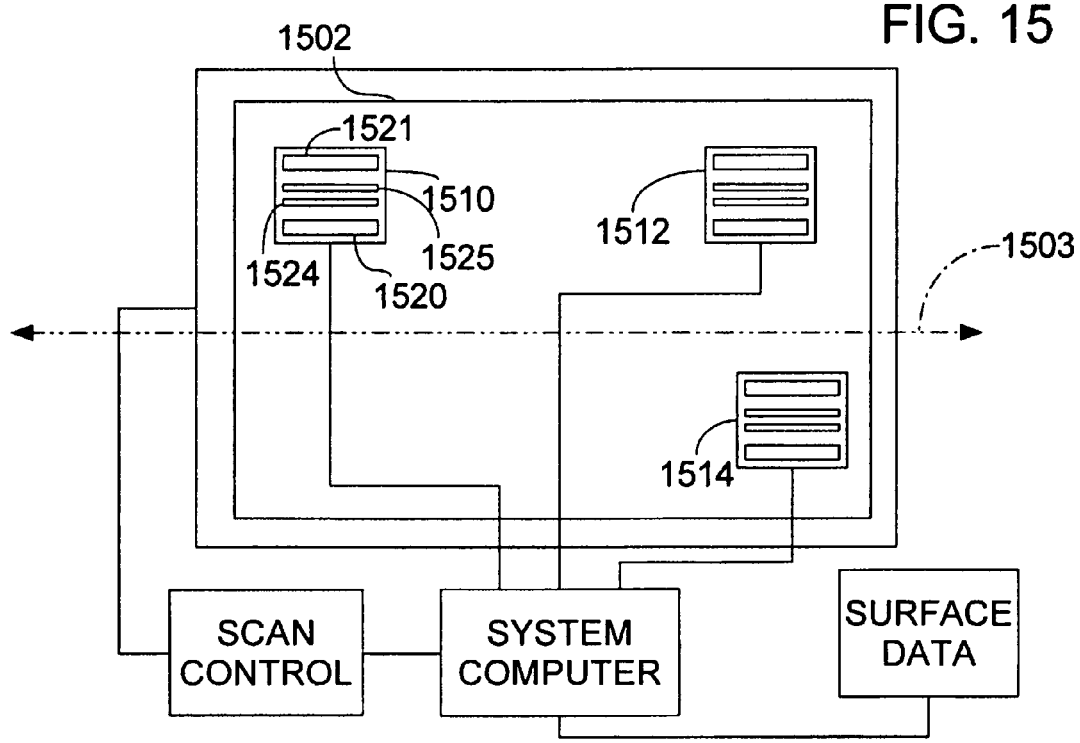

Another arrangement is illustrated in FIG. 15. Imager/illuminator assemblies 1510, 1512, 1514 are situated with respect to a workpiece 1502 so as to produce images of at least a portion of a surface that are associated with at least two (or more) different axes of incidence. As shown in FIG. 15, the workpiece is arranged so as to be transported along an axis 1503. The imager/illuminator assembly 1510 includes LED illuminators 1520, 1521 (such as red LEDs and green LEDs, respectively, or arrays of such LEDs) and image sensor line arrays 1524, 1525 that are aligned approximately parallel to the axis 1503. The remaining assemblies 1512, 1514 are similarly configured. Each of these assemblies can provide dual illumination based images, and only one such assembly can be provided.

The examples presented above are convenient illustrative embodiments, and are provided for purposes of explanation. These examples are not to be taken as limiting, and I claim all that is encompassed by the appended claims.

I claim:

1. An apparatus for assessing surface roughness of a wood test surface, comprising:
    an illumination source configured to direct a first illumination flux and a second illumination flux to a wood test surface along a first axis of incidence and a second axis of incidence, respectively, the first and second illumination fluxes having different wavelengths;
    an imaging system configured to produce a first image of a selected portion of the wood test surface based on the first illumination flux and a second image of the selected portion of the wood test surface based on the second illumination flux; and
    a processor configured to provide an indication of the surface roughness of the wood test surface on the first image and the second image;
    wherein the processor is configured to produce a combined image of the selected portion based on the first image and the second image, the combined image having a single intensity value for each image location and edge filter the combined image to generate the indication of the surface roughness.

2. The apparatus of claim 1, wherein the first and second axes of incidence are substantially coplanar.

3. The apparatus of claim 1, wherein the first and second axes of incidence are substantially symmetric.

4. The apparatus of claim 1, wherein the first illumination flux consists essentially of optical radiation at wavelengths corresponding to red and the second illumination flux consists essentially of optical radiation at wavelengths corresponding to green.

5. The apparatus of claim 4, wherein the imaging system comprises a color image sensor comprising a first detector set responsive to optical radiation at wavelengths associated with red and a second detector set array responsive to optical radiation at wavelengths associated with green.

6. The apparatus of claim 5, wherein the first and second axes of incidence are substantially symmetric.

7. The apparatus of claim 5, wherein the color image sensor is a line image sensor.

8. The apparatus of claim 6, wherein azimuthal angles of the first and second axes of incidences are between about 20 degrees and 70 degrees.

9. The apparatus of claim 6, wherein the azimuthal angles are between about 40 degrees and 60 degrees.

10. The apparatus of claim 8, wherein the indication is a surface roughness map.

11. The apparatus of claim 8, wherein the indication is a surface quality grade.

12. The apparatus of claim 1, wherein the processor is configured to produce the combined image as a difference between independently scaled intensity values of each of the first and second images.

13. The apparatus of claim 12, wherein the scaled intensity values for the first and second images are based on first and second image data histograms, respectively.

14. The apparatus of claim 13, wherein the processor is further configured to logarithmically convert the scaled intensity values, and the combined image is based on the difference between the logarithmically converted scaled intensity values.

15. A system for assessing surface roughness of a wood surface, comprising:
    at least one illumination source configured to direct at least a first illumination flux and a second illumination flux along a first axis of incidence and a second axis of incidence, respectively, to a wood surface under test, the first and second illumination fluxes having different wavelengths;
    an imaging system configured to produce at least a first image and a second image of a selected portion of the wood test surface based on the first illumination flux, and the second illumination flux, respectively;
    a scanning system configured to position the imaging system with respect to the wood test surface so as to produce the first image and the second image, and provide a first position indication associated with the first image and a second position indication associated with the second image; and
    a processor configured to receive the first image and the second image, independently scale the first image and the second image based on a common available scale range, using difference image data based on the scaled images produce a combined image of the selected portion of the wood test surface based on the first image, the second image, the first position indication, and the second position indication, and edge filter the combined imagine, wherein the edge filtered combined image provides an indication of surface roughness in the selected portion of the wood test surface.

16. The system of claim 15, wherein the first illumination flux and the second illumination flux are substantially red and green illumination fluxes, respectively.

17. The system of claim 16, wherein the imaging system includes at least a first detector array and a second detector array that are responsive to the red and green illumination fluxes and produce the first image and the second image, respectively.

18. The system of claim 16, wherein the imaging system includes a color line scan camera comprising a first detector array and the second detector array that are responsive to the red and green illumination fluxes, respectively.

19. The system of claim 16, wherein the first axis of incidence and the second axis of incidence are substantially symmetric.

20. The system of claim 19, wherein the first axis of incidence and the second axis of incidence have azimuthal angles between about 30 degrees and 60 degrees.

21. The apparatus of claim 15, wherein the scaled intensity values for the first and second images are based on a common percentile ranking.

22. A method for assessing surface roughness of a wood surface, comprising:
    illuminating at least a selected portion of the wood surface under test with a first illumination flux along a first axis of incidence and a second illumination flux along a second axis of incidence;
    using one wavelength for the first illuminating flux and a different wavelength for the second illumination flux,
    obtaining a first image and a second image of at least the selected portion based on the first illumination flux and the second illumination flux;
    processing the first image and the second image of the selected portion to produce a combined image of the selected portion based on difference image data, the combined image having a single intensity value for each image location, providing an indication of surface roughness in at least the selected portion of the wood test surface.

23. The method of claim 22, wherein the first axis of incidence and the second axis of incidence area substantially symmetric.

24. The method of claim 22, wherein the first axis of incidence and the second axis of incidence have azimuthal angles of between about 25 degrees and 75 degrees.

25. The method of claim 22, further comprising obtaining the difference image data based on a difference between independently scaled intensity values of each of the first and second images, wherein the scaled intensity values for the first and second images are based on a common percentile ranking, and wherein the indication of surface roughness is based on thresholding of the difference image data.

* * * * *